United States Patent
Nadalini

[15] 3,643,644
[45] Feb. 22, 1972

[54] TEMPLATE COPYING DEVICE FOR MACHINE TOOLS

[72] Inventor: Adino Nadalini, Padova, Italy

[73] Assignee: Soc. Az. Industrie Meccaniche Padovane Saimp, Padova, Italy

[22] Filed: Feb. 9, 1970

[21] Appl. No.: 9,918

[30] Foreign Application Priority Data

Feb. 11, 1969  Italy...................................12706 A/69

[52] U.S. Cl. ...............................................125/11, 82/14 R
[51] Int. Cl. ......................................B24b 53/08, B23b 3/28
[58] Field of Search......................82/14, 14.1, 14.3; 125/11

[56] References Cited

UNITED STATES PATENTS

| | | | |
|---|---|---|---|
| 2,645,967 | 7/1953 | Zelewsky | 82/14.1 X |
| 2,775,235 | 12/1956 | Jessup | 125/11.1 |
| 2,861,561 | 11/1958 | Olson | 125/11 |
| 2,900,974 | 8/1959 | Hill | 125/11 |

*Primary Examiner*—Harold D. Whitehead
*Attorney*—Stevens, Davis, Miller & Mosher

[57] ABSTRACT

Device for working with a template, for lathes and grinding machines, in which a control support advances with continuous motion parallel to the axis of the machine, the tool is carried by a first slide of a pair of slides connected with the advancing support, one slide being movable parallelly to the axis of advance and the other being movable perpendicularly, said first slide being mounted on the other slide and being connected to it and to the advancing support through a rectilinear guide and follower, in which the guide is rigidly connected to the first slide and is oriented at 45° while the follower is rigidly connected to the advancing support.

11 Claims, 4 Drawing Figures

TEMPLATE COPYING DEVICE FOR MACHINE TOOLS

BACKGROUND OF THE INVENTION

1. Field of the Invention

The present invention relates to a device, applicable to lathes or grinding machines, for automatically controlling a tool in relation to a given template that represents the finished workpiece.

2. Description of the Prior Art

Automatic devices for controlling the tool, particularly in copying lathes, have already been made. They generally comprise a slide to one end of which the tool is connected and to the other end of which is connected a feeler that follows the profile of the template to be copied. This slide is mounted transversely on a support that is caused to advance progressively along the axis of the machine.

The combination of the principal advancing movement and the movement of the slide permits the production of profiles orientated at a predetermined angle relative to the axis of the machine.

In order to produce profiles orientated at 90° relative to the axis of the machine—which constitutes a fundamental problem in the working of pieces with projections or in general with stepped profiles—it has been proposed to dispose the slide carrying the tool at an angle, preferably 30° to 45°, relative to the direction of advance, viz, to the axis of the machine. In this manner every movement of the slide can be resolved into two directions, one parallel to the direction of advance and the other at 90° relative to this direction. The first of these movements is intended to compensate the advancing movement of the machine, being in the opposite sense thereto, while only the second movement is effective in producing the 90° profile.

The main limitation of this device is that it is incapable of following profiles parallel to the axis of the slide or forming a relative small angle, less than 30°, with this axis. In this case in fact, the component of the movement of the slide along the profile relative to the component along the direction of advance of the machine, is so large as to render the movement practically impossible.

Another disadvantage of this device, with a tool-carrying slide disposed at 30° to 45°, is that at the end of each forward working stroke a return nonworking stroke has to be effected back to the initial position—for the successive operations of profile trueing, so that the machine is incapable of operating in both directions of advance. In this case it is evident that the nonworking return stroke appreciably reduces the production capacity of the machine.

SUMMARY OF THE INVENTION

The device according to the present invention eliminates these disadvantages and permits the working of complex profiles, and the use of the return stroke of the machine for working the piece. The device is characterized by an advance controlling support with which are associated a pair of slides, one of which is movable in a direction parallel to the axis of advance, and the other of which is movable in a direction perpendicular thereto. The first of these slides is mounted on the other and is connected to it and to the advance controlling support by coacting means that cause each movement of the first slide relative to the second slide to result in a proportional movement of the second slide relative to the advance controlling support, or vice versa, said first slide carrying the tool and a member for feeling the profile of the template.

In a preferred embodiment of the invention the said coacting means are constituted by a simple mechanical guide and follower connection, in which the guide, which is rectilinear, is rigidly fixed to the said first slide, and is orientated at 45° relative to the axis of the said slide, while the follower is rigidly fixed to the support for advance of the machine. This 45° connection permits a movement of the first slide along its axis only simultaneously with a corresponding movement in a direction perpendicular to the axis, this latter movement being permitted only by reason of the movement of the second slide along its own axis.

Preferably the second slide is mounted so as to slide in the direction of the axis of the machine, or in the direction of advance of the support, while the first slide is mounted on the second slide, perpendicular to it. This arrangement permits working with a tool-carrying slide disposed normal to the axis of the machine and quite capable of producing profiles with steps which are perpendicular to the axis of the machine. The advantage of this arrangement derives from the fact that the template to be copied is not located laterally but is disposed in exact alignment with the piece being worked, which permits easier and more rapid positioning and more effective and immediate control.

BRIEF DESCRIPTION OF THE DRAWINGS

Some embodiments of the invention will not be described by way of example with reference to the accompanying drawings, in which.

DESCRIPTION OF THE PREFERRED EMBODIMENTS

Figure 1:
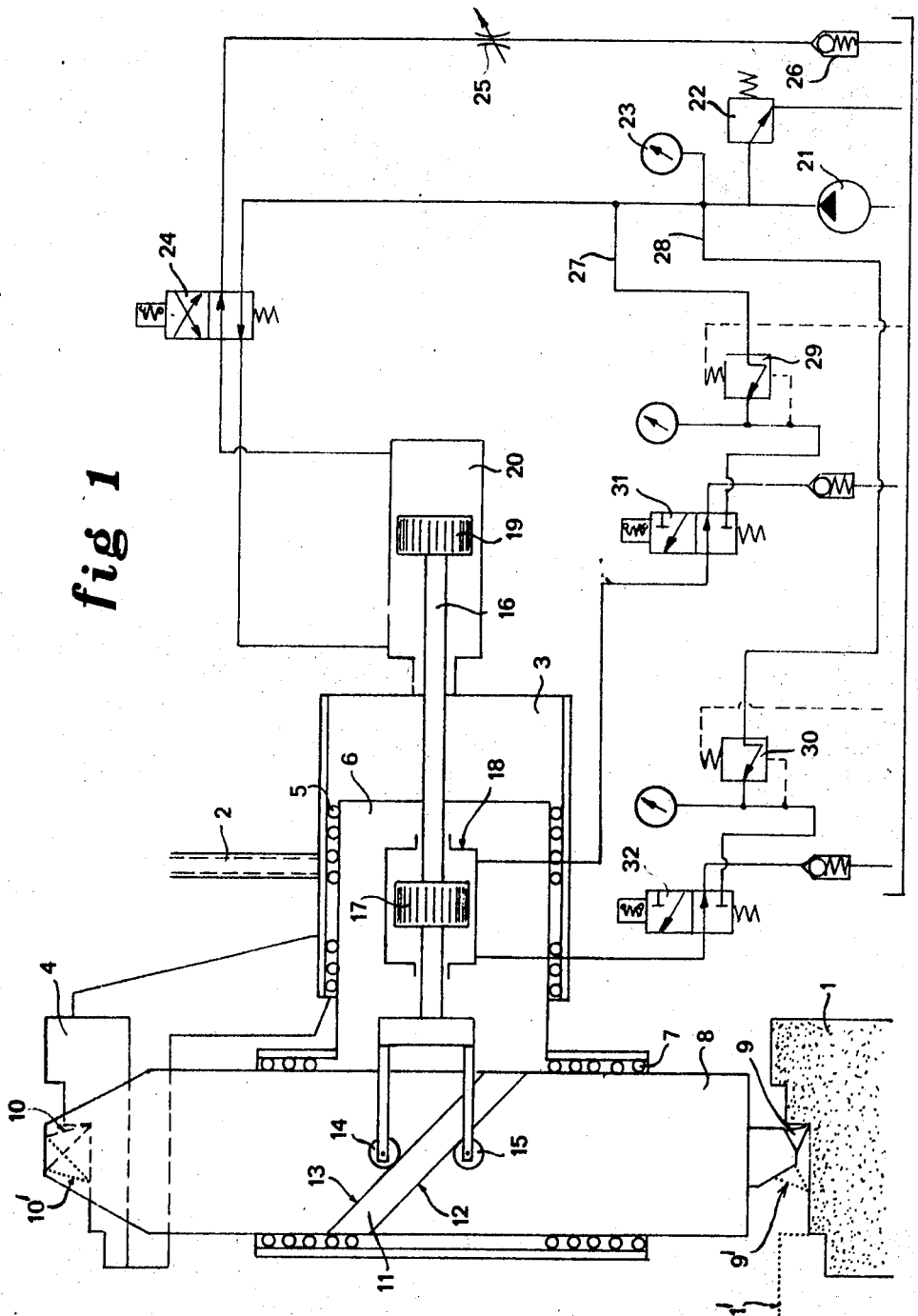
FIG. 1 shows diagrammatically a device, with hydraulic control, for use on a grinding machine for trueing.

Referring to FIG. 1, in proximity to the grindstone 1 to be trued is disposed a guide support 3, the position of which is adjustable perpendicular to the axis of the grindstone 1 by means of a screw 2. On the support 3 is fixed a template 4. In guides 5 in the support 3 a slide 6 is slidable parallel to the axis of the grindstone. On the slide 6 another slide 8 is slidable in guides 7 perpendicular to the axis of the grindstone. On the slide 8 are mounted a trueing diamond 9 and, at the opposite end, a feeler 10.

Also on the slide 8, at 45°, is fixed a rectilinear guide 11 having tracks 12 and 13, precisely located relative to rollers 14 and 15 fixed on a support on the end of a rod 16 of a piston 17. The piston 17 is slidable in a cylinder 18, which is solid with the slide 6. A second piston 19 on the rod 16 is slidable in a cylinder 20 solid with the support 3.

The control means for the device are electrohydraulic and comprise the following elements:

a constant delivery pump 21, a calibrated valve 22 for controlling the pressure of the system, which can be read on the manometer 23, a four-way electrovalve 24 for controlling the movements of the piston 19 in the cylinder 20 in both directions, a valve 25 for regulating the oil supply to the cylinder 20 and hence the speed of movement of the diamond 9, a nonreturn valve 26 which prevents the system from emptying when the device is inoperative, two controls derived from the pump 21 via conduits 27 and 28, the pressures in which are respectively regulated by calibrated valves 29 and 30, and two three-way electrovalves 31 and 32 which control the two chambers of the cylinder 18 and act alternatively on the faces of the piston 17.

The pressure-regulating valves 29 and 30 set so that in the two chambers of the cylinder 18 there obtains a differential pressure which is slightly higher in the right-hand chamber of the cylinder 18, tending to shift the slide 6 to the right in the sense of the arrow F. Hence side 13 of the guide 11, acting against the roller 14, tends to cause downward movement of the slide 8, bringing the feeler 10 into contact with the template 4 with light pressure. This pressure is set by regulation of the valves 29 and 30 in such manner as to obtain optimum conditions of sliding of the feeler 10 on the template 4 and of movement of the diamond 9.

With the feeler applied to the template 4, the trueing phase is initiated by movement towards the left, which is controlled as already stated, by the electrovalve 24, which acts on the piston 19 the speed of movement of which is regulated by the valve 25. During the movement towards the left (forward phase), while the feeler 10 bears on a part of the template 4 parallel to the axis of the machine, the slide 6 remains solid with the piston 17, while the slide 8 follows the profile of the template via the feeler 10. At the instant at which the feeler 10 encounters a change in the profile of the template 4, for example a step downward, the slide 8 follows this change precisely owing to the action of the oblique guide 11 and of the differential pressure obtained in the chambers of the cylinder 18 which, causing the slide 6 to stop, compensates the advancing movement of the piston 19 and maintains the feeler 10 continuously in contact with the profile of the template 4.

At the end of the stroke towards the left (forward phase) the control exerted by the valve 24 is reversed to initiate the working stroke towards the right (return phase).

During the return movement the slide 6 moves to the right and, until the feeler 10 moves on to a horizontal part of the profile the slide 8 remains in equilibrium. At the instant at which the feeler 10 engages a step, for example upwards, on the template 4, the pull exerted by the piston 19 via the roller 15 on the side 12 of the guide 11 is translated into an upward component of movement of the slide 8. At the same time there is an increase in the pressure in the right-hand chamber of the cylinder 18 which is quickly balanced by the reestablishment of the initial conditions of hydraulic equilibrium between the two chambers of the cylinder 18 due to a movement of the slide 6 to the left.

In this return phase also, as in the forward phase, the feeler 10 follows faithfully the profile of the template 4 and hence the two phases are both productive, with the exclusion of nonworking time.

By means of the screw 2 it is also possible to regulate the position of the device relative to the grindstone, either manually or automatically for the resumption of the use of the grindstone.

Owing to the facility of movement of the slide 8, the template 4 may have profiles more complicated than that illustrated, for example as shown by the dotted line 1'. In this case it is sufficient to use one diamond 9 and one feeler 10, both having two points 9' and 10'.

Alternatively, instead of diamonds and feelers with two points the diamond 9 and the feeler 10 may be mounted on suitable carriers having two positions, for example a bar or turret rotating through 180° about the axis of the slide 8. In this case, in the forward phase the steps are from right to left downwardly and in the return phase they are from left to right downwardly.

The principle of operation of the device according to the invention, as applied to a lathe (see FIG. 2) differs from that of the trueing device illustrated in FIG. 1 only as regards the feeler, which in the case of a lathe is a true and correct member for reading the profile of the template and the tool to be profiled, which instead of a diamond is a tool to be copied.

The device comprises a support 34 movable parallel to the axis of the lathe by means of a screw 33, these parts taking the place of the elements bearing the references 2, 3 and 20 in FIG. 1. On the support 34 is mounted, in guides 36, a slide 35 movable in the forward direction. On the slide 35 is mounted, in guides 40, a slide 39 slidable perpendicularly to the axis of the template 37 and the axis of the workpiece 38. This slide 39 carries at one end the turning tool 41 and at the other end a hydraulic feeler 42. On the slide 39 is also mounted a rectilinear guide 11 coacting by means of tracks 12 and 13 with the rollers 14 and 15 which—analogously to the arrangement of FIG. 1—are solid with the rod 43 of a piston 44, which is rigidly connected to the support 34 by means of a support 46.

The piston 44 is slidable in a cylinder 45 which in turn is solid with the slide 35.

Control of the device is effected by means of a pump 47 which feeds the reading member 42 by which the cylinder 45 is governed.

The support 34 is caused to advance by a continuous movement of the screw 33, and when the feeler 42 is in contact with a part of the profile of the template 37 which is straight and parallel to the axis of the lathe the hydraulic control device for the reading member 42 is in a condition of equilibrium and produces equal pressures in both of the chambers of the cylinder 45, rendering it solid with the piston 44 and in consequence with the motion of the support 34. Likewise the slide 39 remains fixed by means of the elements 11, 14 and 15 and moves only parallel to the axis of the lathe.

At the instant at which the feeler 42 encounters a change of profile on the template 37 there is a movement of the control device of the reading member and at the same time a differential pressure is produced in the two chambers of the cylinder 45, which is translated into a relative movement between the piston 44 and the cylinder-slide 45–35, which move relative to the support 34. Owing to the rigidity of the assembly of piston 44, rod 43, rollers 14 and 15 and support 34, the slide 39 moves transversely under the force of the guide 11, and the tool 41 fixed on the slide follows faithfully the movement of the feeler 42 on the template 37, generating the profile of the workpiece. It is obvious that according to the profile of the template and the consequent position of the control device of the reading member, the slide 35 performs a movement to the left or right and the slide 39 performs a movement towards or away from the axis of the workpiece.

In a similar manner to that described in connection with FIG. 1, in this case also it is possible—for the production of profiles that are more complicated, for example with upward or downward steps—to use two tools 41 and two feelers 42.

Figure 2:
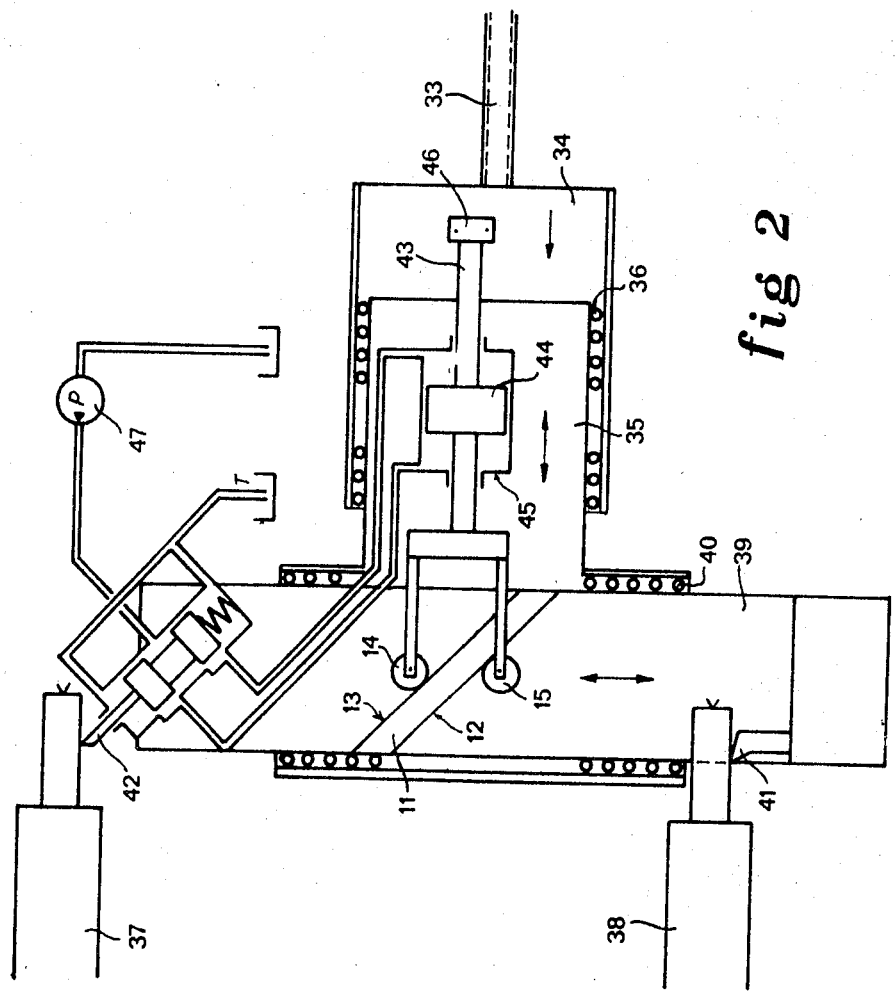
FIG. 2 shows diagrammatically a device, with hydraulic control, for application to a lathe.
Figure 3:
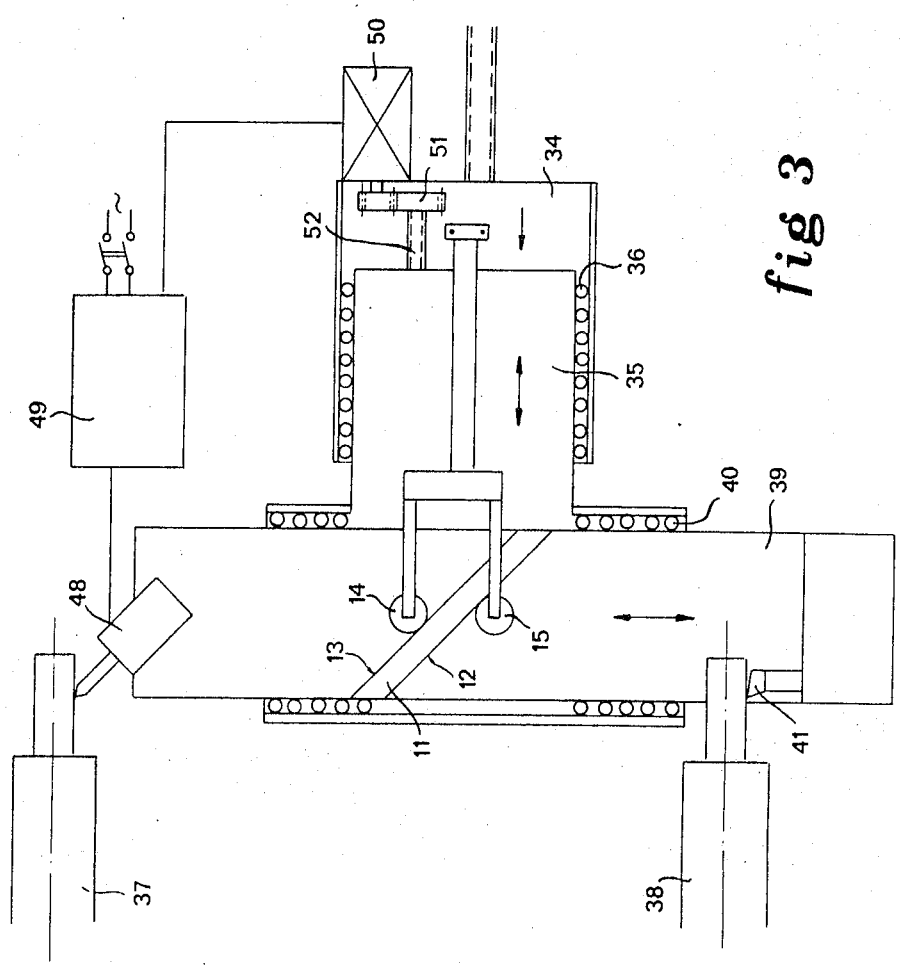
FIGS. 3 and 4 are examples of devices, with electrical control and digital control, for use on lathes.

In the arrangement shown in FIG. 3, the device is in the main similar to that shown in FIG. 2. Only the elements 42–44–45 are replaced by an electromechanical control.

On the slide 39, at the end adjacent the template, is mounted an electrical feeler 48 which acts, via a control assembly 49, on a servomotor 50 which is mounted in rigid manner on the advancing support 34 and which controls via gearing 51 and a screw 52 the axial movements of the slide 35 relative to the support 34. The servomotor 50 is bidirectional, and in response to signals coming from the feeler 48 via the control assembly 49 it moves the slide 35 to the left or right relative to the support 34. All the other operations of the device take place in the same manner as with the device of FIG. 2.

Figure 4:
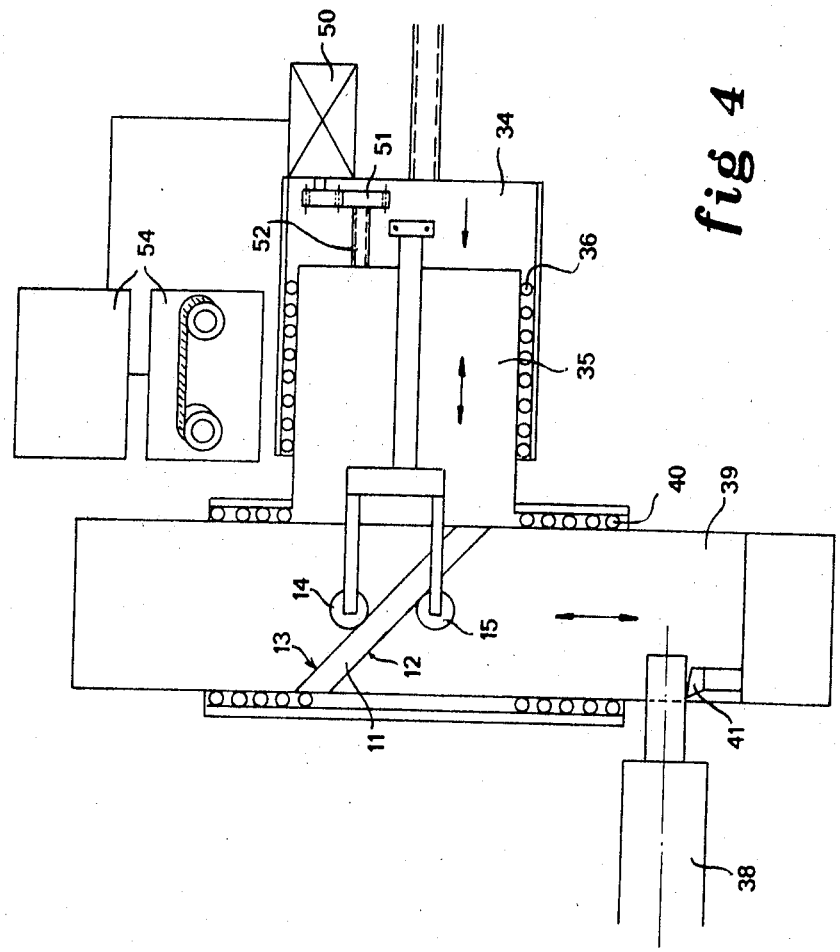

In the arrangement shown in FIG. 4 the device again comprises a servomotor 50, as in FIG. 3, but in this case control of the motor 50 is effected not by a feeler and a template, but by a governor unit 54 with digital control, in which a program corresponding to one or more profiles is recorded on tape.

The embodiments described are only some examples of applications of the invention. Modifications may be made without exceeding the scope of the invention. It is evident that the slides may be arranged differently from as shown; for example, referring to FIG. 4, with the slide 39 slidable on the slide 35 and parallel to the axis of the lathe, and the slide 35 slidable perpendicularly thereto.

I claim:

1. In a lathe or grinding machine a template copying device comprising a control support which is caused to advance with continuous motion parallel to the axis of the machine, a first slide and a second slide, said second slide being mounted on said control support for parallel movement to said axis of the machine and said first slide being mounted on said second slide for perpendicular movement to said axis of the machine, cooperating means which make a movement of the first slide relative to the second slide, correspond with a proportional movement of the second slide relative to the control support, and a working tool and a feeler both being mounted on said first slide.

2. Device as in claim 1, wherein said cooperating means comprise a rectilinear guide, said guide being integral with said first slide and at an angle of 45° with respect to the axis of the machine, a follower cooperating with said guide, said follower being integral with the control support of the machine, and driving means which operate between said second slide and said control support or the follower integral therewith.

3. Device according to claim 2, in which the follower includes a pair of rollers which are in contact without play with opposite faces of the said rectilinear guide, said pair of rollers being mounted at one end of a rod connected at the other end to the advancing support.

4. Device according to claim 3, in which the first slide is arranged to be movable perpendicularly to the axis of the machine and carries at one end the trueing or turning tool and at the other end a member for reading the profile of the template to be copied, the second slide being movable parallel to the axis of the machine.

5. Device according to claim 4, in which to the said rod carrying the follower with rollers is also connected a piston slidable in a cylinder solid with the second slide.

6. Device according to claim 5, in which the reading member is formed by a feeler in engagement with the template to be copied, its pressure of application being determined by a differential hydraulic pressure on the two faces of the piston connected to the rod carrying the follower with rollers.

7. Device according to claim 5, in which the member for reading the profile of the template is constituted by a hydraulic feeler, the movements of which cause flow of fluid under pressure from one side to the other of the piston connected to the rod carrying the follower with rollers, to effect corresponding movements of the said second slide.

8. Device according to claim 4, in which the member for reading the profile of the template is constituted by an electrical feeler which controls the rotation in one direction or the other of a servomotor mounted on the advancing support, the latter being adapted to control the movements of the second slide relative to the said advancing support.

9. Device according to claim 4, in which the member for reading the profile of the template is constituted by a storage device with digital control, in which the profile of the template is directly recorded, the said storage device controlling the rotation in one direction or the other of a servomotor mounted on the advancing support, the latter being adapted to control the relative movements of the second slide relative to the said advancing support.

10. Device according to claim 3, in which the first slide is arranged so as to be movable parallel to the axis of the machine and carries both the trueing or turning tool and a member for reading the profile of the template, the second slide being movable perpendicularly to the axis of the machine.

11. Device according to claim 3, in which there is mounted on the first slide so as to be rotatable through 180° about an axis parallel to the axis of the slide, a bar or turret carrying the tool and the member for reading the profile of the template.

* * * * *